UNITED STATES PATENT OFFICE.

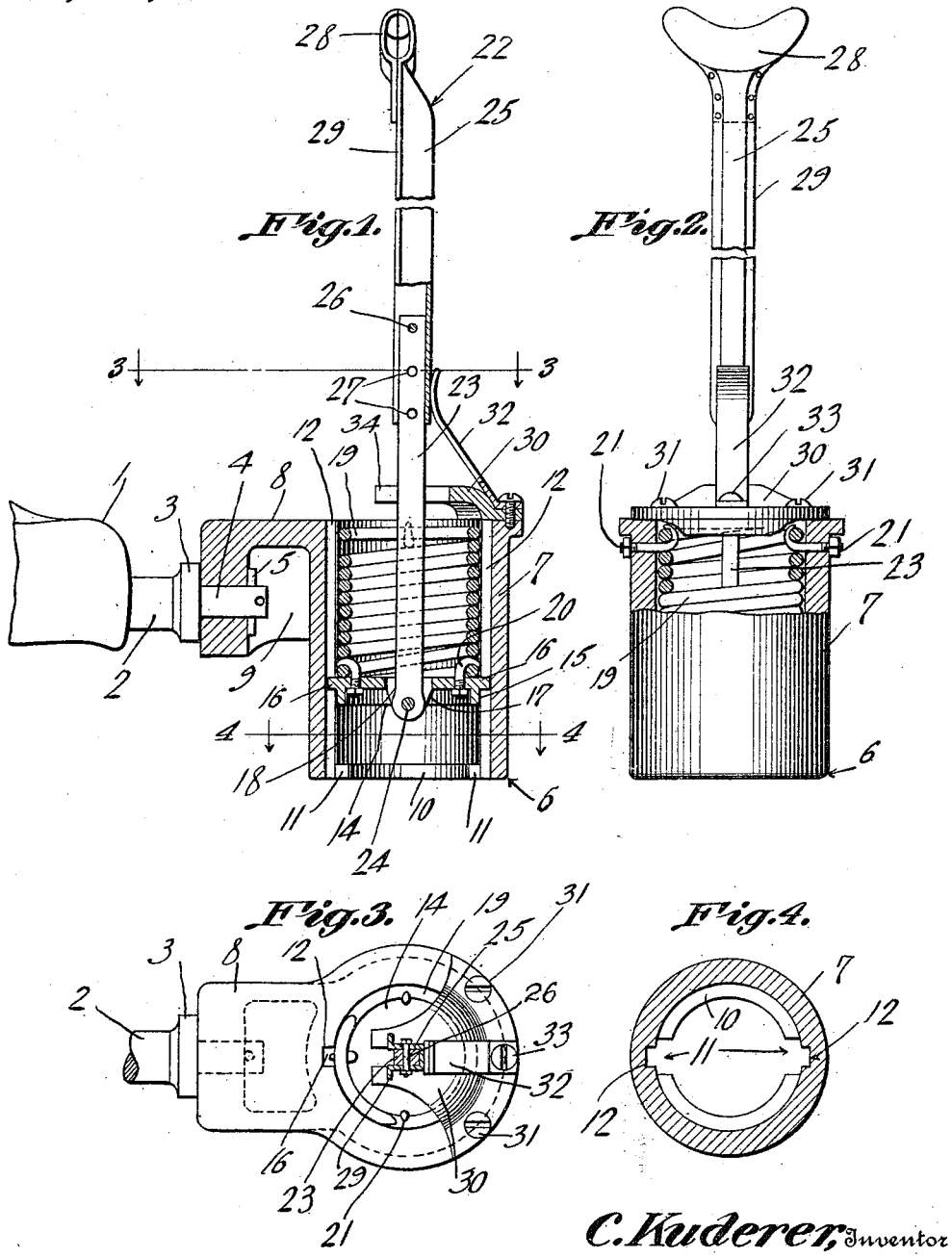

CHARLES KUDERER, OF PITTSBURGH, PENNSYLVANIA.

MOTOR-CYCLE BACK-REST.

1,272,970.  Specification of Letters Patent.  Patented July 16, 1918.

Application filed October 25, 1917. Serial No. 198,483.

*To all whom it may concern:*

Be it known that I, CHARLES KUDERER, a citizen of the United States, residing at Pittsburgh, in the county of Allegheny and State of Pennsylvania, have invented a new and useful Motor-Cycle Rest, of which the following is a specification.

The device forming the subject matter of this application is adapted to be applied to a cycle of any kind, and ordinarily but not necessarily used in connection with a motor cycle, the end in view being to provide means whereby the rider may be supported, partially at least, from his arm pits, and thus be supported yieldingly, in order to take jars off the base of the spine.

The invention aims to provide novel means for supporting yieldingly, the member which engages with the arm pit of the rider, to improve the means whereby the structure is assembled with the seat of a motor cycle, and, generally, to improve and to enhance the utility of devices of that type to which the present invention appertains.

With the above and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Figure 1 shows the device forming the subject matter of this application in longitudinal section, parts appearing in elevation, the structure being assembled with the seat of a motor cycle, and it being presupposed that the observer is looking at the rear of the cycle seat;

Fig. 2 is a side elevation wherein the structure is viewed at right angles to the showing of Fig. 1, parts being broken away, and parts appearing in section;

Fig. 3 is a cross section on the line 3—3 of Fig. 1; and

Fig. 4 is a cross section on the line 4—4 of Fig. 1.

The numeral 1 denotes the seat on the motor cycle with which is assembled, in any desired way, a cross bar 2. The cross bar 2 is provided at its ends with duplicated structures, but since these structures are alike, but one of them is shown in the drawings and described. The bar 2 is provided adjacent its end with a shoulder 3 from which projects a reduced stem 4, through which passes a retaining element 5.

The invention comprises a base, denoted generally by the numeral 6, and including a tubular casing 7 having a lateral lug 8 supplied in its bottom with a recess 9. The stem 4 passes through the rear wall of the lug 8, and the retaining element 5, together with the outer end of the stem 4, is located in the recess 9. Owing to this construction, the casing 7 is so mounted on the stem 4 that the casing can swing parallel to the line of advance of the cycle of which the seat 1 constitutes a part. At its lower end, the casing 7 is provided with an inwardly extended flange 10 having oppositely disposed openings 11 arranged in line with upright guide grooves 12 formed in the inner surface of the casing 7. A disk-like follower 14 is mounted for right line sliding movement in the casing 7 and is provided with a depending flange 15, which, coöperating with the casing 7, prevents the follower 17 from tilting and jamming in the casing. The follower 14 comprises lateral projections 16 slidable in the guide grooves 12 and serving as a means whereby the follower is prevented from rotating in the casing 7. Since the flange 10 is provided with the openings 11, foreign matter cannot accumulate in the guide grooves 12 of the casing 7. The follower 14 is provided with depending ears 17, but one of which is shown in the drawings. Between the ears 17, the follower 14 is supplied with an opening 18.

A means is provided for limiting, yieldingly, the downward movement of the follower 14 in the casing 7, and with this end in view a helical spring 19 is provided, the lower end of the spring 19 being connected by means of hook bolts 20, or otherwise, with the follower 14 within the contour of the flange 15, the upper end of the spring 19 being connected, in a similar manner, as shown at 21, with the casing 7 near to the upper end of the casing. The flange 10 prevents the follower 14 from dropping out of the casing 7 should the hook bolts 21 or 20 fail and release the spring 19.

The invention comprises a support, denoted generally by the numeral 22, and including a lower part 23, in the form of a bar, passing through the opening 18 in the follower 14 and connected to the ears 17 of the follower by means of a pivot element 24, the construction being such that the lower part 23 of the support can swing to a limited extent in a direction at right angles to the line of advance of the cycle of which the seat 1 forms an element. The support 22 includes an upper part 25 which, in cross section, as shown in Fig. 3, is U-shaped in outline, the upper part of the support having lateral flanges 29. The upper end of the lower part 23 of the support is received slidably, for adjustment, in the upper part 25 of the support, and in order that the effective length of the support may be varied, the upper part 25 of the support carries a bolt 26 or like connecting device, adapted to be received in openings 27 formed in the lower part 23 of the support. At the upper end of the part 25 of the support, a crutch 28 is disposed, the crutch being connected with the side flanges 29 of the upper part of the support, if desired.

The invention comprises a guide plate 30 having a slot 34. A portion of the guide plate is elevated slightly above the upper end of the casing 7, the periphery of the guide plate being attached to the upper end of the casing 7 by means of securing elements 31. The lower part 23 of the support is received in the slot 34 of the guide plate 30, and thus, the swinging movement of the support 22, on the pivot element 24, transversely of the line of the cycle, is regulated and controlled.

In order to limit the outward swinging movement of the support 22 in a direction at right angles to the line of advance of the cycle, a spring arm 32 is attached at its lower end by means of a securing device 33 to the guide plate 30 and to the casing 7. The spring arm is inwardly inclined, and its upper end is curved to bear against the support 22.

In practical operation, the effective length of the support 22 may be varied, by adjusting the bolt 26 in the openings 27, until the crutch 28 coöperates properly with the arm pit of the rider. The base 6 together with the support 22 can swing in a direction parallel to the line of advance of the cycle, because the lug 8 is mounted for rocking movement on the stem 4 of the cross bar 2. The support 22 can swing inwardly and outwardly, in a direction at right angles to the line of advance of the cycle, because the lower end of the support 22 is pivotally connected with the follower 14 by means of the element 24, the swinging movement of the support 22 being regulated and controlled, since the lower part 23 of the support is received in the slot 34 of the guide plate 30. Outward swinging movement of the support 22 is limited by the spring 32, and, consequently, the crutch 28 is held to the side of the body of the rider yieldingly.

The support 22 can reciprocate vertically in the slot 34 of the guide 30, the follower 14 reciprocating in the casing 7, and the spring 19 serving to limit the downward movement of the support yieldingly. Since the follower 14 embodies the projections 16 which are received in the guide grooves 12 of the casing 7, the follower cannot rotate about a vertical axis, and because the follower cannot rotate about a vertical axis, the crutch 28 will always remain positioned properly with respect to the arm pit of the rider.

Attention is directed to my co-pending application No. 187,684, for Letters Patent on a motor cycle back rest, filed August 22, 1917. In the application above identified by serial number, the broad features common to the device shown therein and to the device shown in this application will be claimed, whereas in this present application, there will be claimed those features which are peculiar thereto. By this procedure, a line of division between the two cases will be maintained.

The device shown in this application is adapted primarily for use on motor cycles, but it may be used to advantage on pedal-propelled cycles, notably if a long journey is undertaken. The structure not only takes much weight off the spine, but also causes the rider to sit erect and prevents what is known in anatomical mechanics as an eccentric loading of the spinal column.

Having thus described the invention, what is claimed is:—

1. In a device of the class described, a casing; means for pivotally assembling the casing with a cycle, for swinging movement in a direction parallel to the line of advance of the cycle; a follower mounted to reciprocate in the casing; a support; means for pivotally assembling the lower end of the support with the follower for swinging movement in a direction substantially at right angles to the line of advance of the cycle; and spring means for limiting the downward movement of the follower in the casing.

2. A device constructed in accordance with claim 1, in combination with spring means carried by the upper end of the casing and coacting with the support to limit the outward swinging movement of the support.

3. In a device for sustaining the rider of a cycle at the arm pit, a cycle seat; a casing; means for pivotally assembling the casing with the seat; a follower mounted to reciprocate in the casing; a support adapted to engage in the arm pit of a rider and pivoted at its lower end to the follower; and spring means for limiting the downward movement of the follower.

4. A device constructed in accordance with claim 3, in combination with interengaging elements on the casing and the follower, coacting to prevent a rotation of the follower.

5. In a device for sustaining the rider of a cycle at the arm pit, a casing; a follower mounted to reciprocate in the casing; spring means for limiting the downward movement of the follower; a support having its lower end pivoted to the follower; and a guide on the casing, the guide coacting with the support to limit the swinging movement of the support on the follower to a single plane.

In testimony that I claim the foregoing as my own, I have hereto affixed my signature in the presence of two witnesses.

CHARLES KUDERER.

Witnesses:
 JOHN T. TEXTOR,
 JAMES H. DOUTT.

Copies of this patent may be obtained for five cents each, by addressing the "Commissioner of Patents, Washington, D. C."